(12) United States Patent
Evers, Jr. et al.

(10) Patent No.: US 6,491,152 B1
(45) Date of Patent: Dec. 10, 2002

(54) CONVEYOR ASSEMBLY

(75) Inventors: Fred W. Evers, Jr., Wesley Chapel, FL (US); Marc Aury, Sarasota, FL (US); Stephane Lorange, Sarasota, FL (US)

(73) Assignee: Gebo Corporation, Bradenton, FL (US)

( * ) Notice: Subject to any disclaimer, the term of this patent is extended or adjusted under 35 U.S.C. 154(b) by 0 days.

(21) Appl. No.: 09/827,522

(22) Filed: Apr. 9, 2001

(51) Int. Cl.[7] ............................................... B65G 47/24
(52) U.S. Cl. ................................. 198/397.01; 198/393
(58) Field of Search ........................ 198/397.01, 397.06, 198/698, 393, 396; 221/160

(56) References Cited

U.S. PATENT DOCUMENTS 4,897,183 A * 1/1990 Lewis et al. ................. 198/698
5,394,972 A * 3/1995 Aidlin et al. ................. 198/393
5,586,637 A * 12/1996 Aidlin et al. ........... 198/397.01

* cited by examiner

*Primary Examiner*—Joseph E. Valenza

(57) ABSTRACT

A conveying system for lifting and orienting bottle caps comprises a conveyer belt of articulated sections and with guide rollers with an upper lifting section having an essentially vertical path of travel and a lower loading section with an angled path of travel. Sprockets on the guide rollers effect movement of the belt in an upward path of travel through the lower section and then the upper section. Cleats are secured to the exterior surface of the conveyer belts. Supporting surfaces of the cleats extend at right angles from the exterior surface of the conveyer belt for retaining bottle caps thereon when the upper surface of the bottle cap is in contact with the conveyer belt and the lower edge thereof supported in a trough of the supporting surfaces of the cleats but to effect the dropping thereof when the bottle caps are not in the proper orientation.

2 Claims, 7 Drawing Sheets

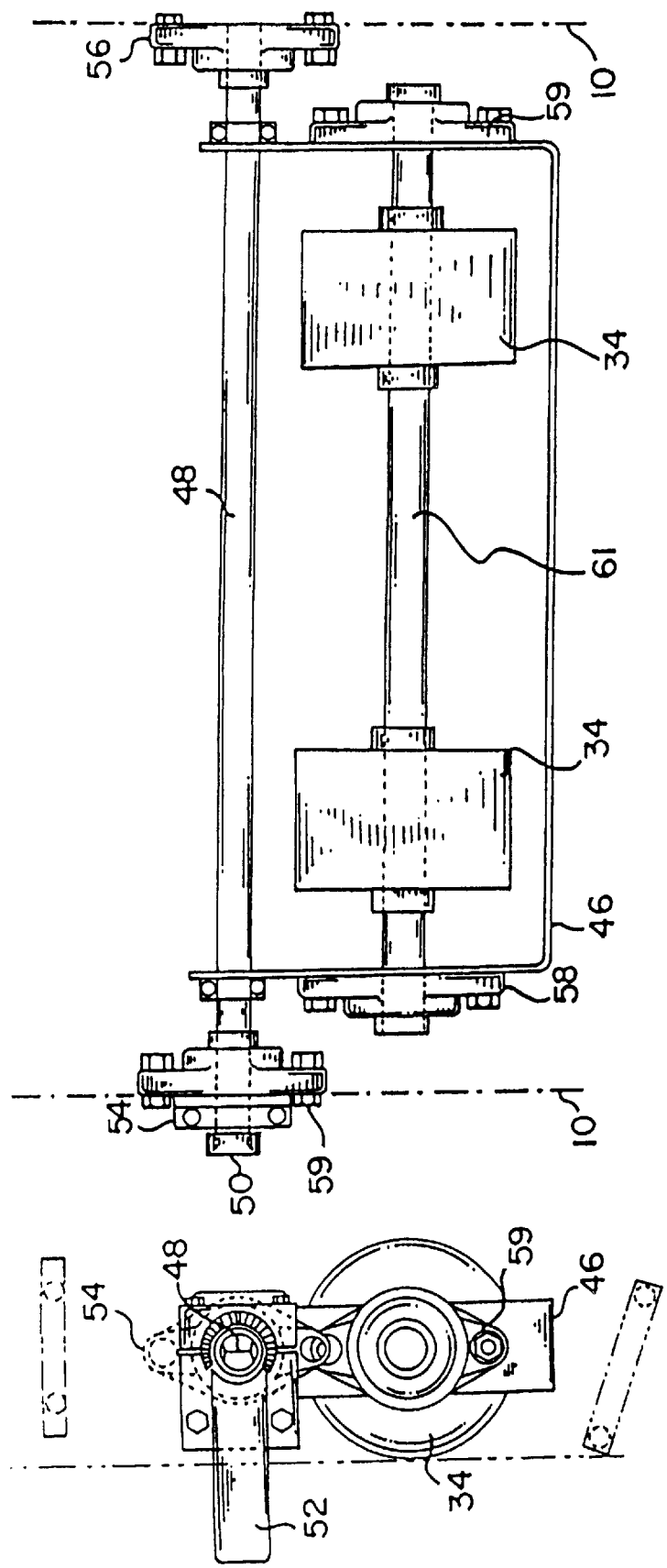

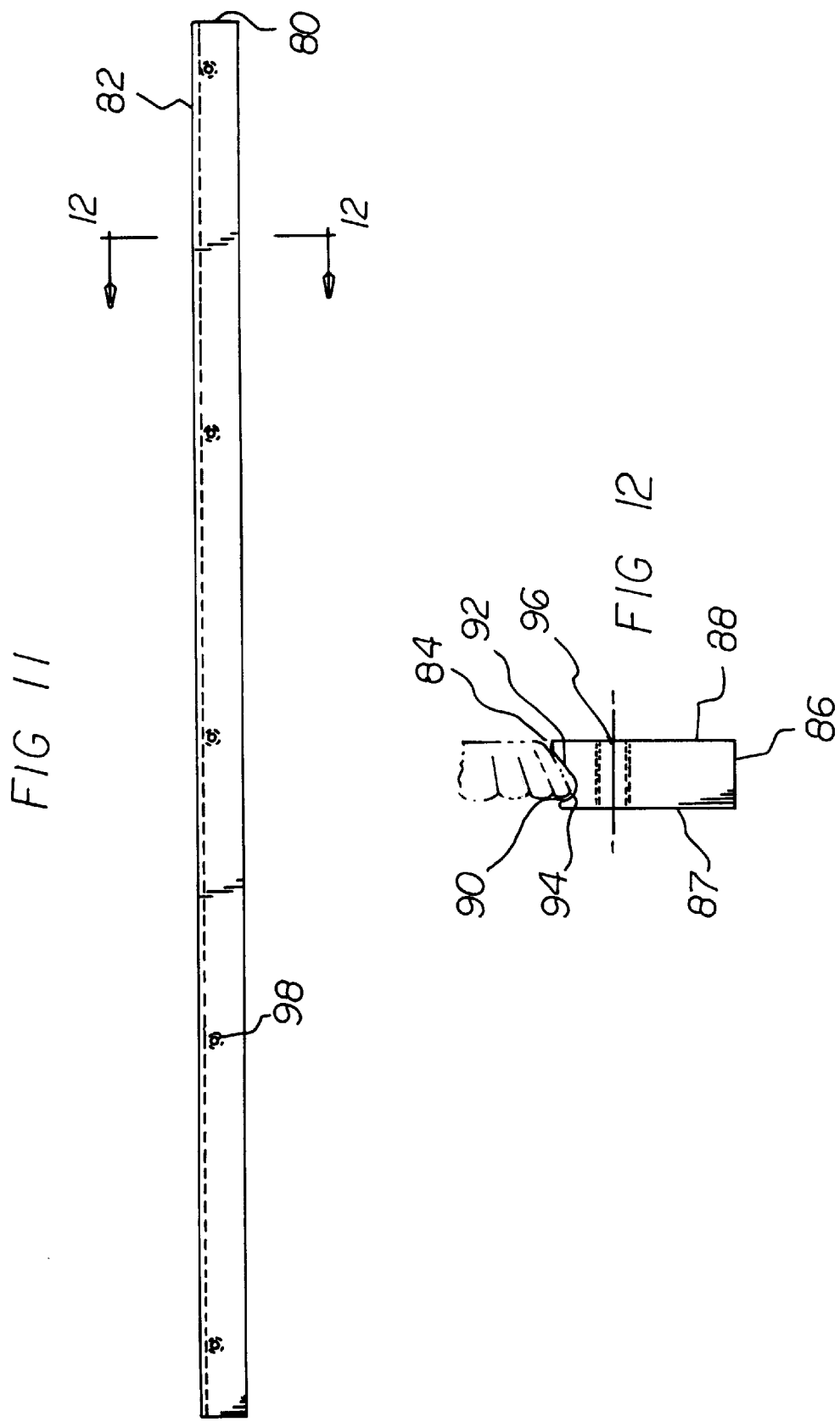

CONVEYOR ASSEMBLY

BACKGROUND OF THE INVENTION

1. Field of the Invention

This invention relates to a conveyor system for lifting and orienting bottle caps and more particularly, to lifting and orienting bottle caps through a conveyor with a lower loading zone and a vertical lifting zone which is 11 adjustable to the needs of the run.

2. Description of the Background Art

In the past, caps, container closures, and crowns with a diameter greater than height, were oriented during feeding by changing the angle of an inclined cleated conveyor. This angle change caused incorrectly oriented caps to fall from the cleat and back into a hopper at a loading zone. Incorrectly oriented caps are considered to be those with the open side toward the conveyor belt. Correctly oriented caps are considered to be those having the open side away from the conveyor belt.

The standard for many years was to begin with an angle at about 25 degree from the vertical angle for increased pickup of caps. The angle change was 20 degrees to an angle of 5 degrees from vertical. This method worked fine for large diameter closures. As the diameter of the closures being conveyed decreases, and the height also decreases, the angle change becomes critical for consistent orientation. Several procedures were tried in attempts to compensate for this. The present invention is a device for varying the angle on all cleated conveyor style cap orientors and feeders. The assembly can be installed on an existing inclined cleated conveyor type orientor to vary the angle.

It is, therefore, an object of this invention to provide an improvement which overcomes the aforementioned inadequacies of the prior art devices and provides an improvement which is a significant contribution to the advancement of the oral inflation art.

Another object of this invention is to provide a new and improved conveying system for lifting and orienting bottle caps comprising a conveyer belt which is formed of articulated sections and with guide rollers to support the belt with an upper lifting section having an essentially vertical path of travel and a lower loading section with an angled path of travel. Also included are sprockets on the guide rollers to effect movement of the belt in an upward path of travel through the lower section and then the upper section. Further included is a plurality of cleats secured to the exterior surface of the conveyer belts. The cleats have supporting surfaces which extend at a generally right angles from the exterior surface of the conveyor belt each cleat being of a generally rectangular cross section with an upper face and a lower face and with an interior face therebetween wherein the upper cap supporting surface having a trough for retaining bottle caps thereon in a proper orientation when the upper surface of the bottle cap is in contact with the conveyer belt and the lower edge thereof supported on the supporting surfaces of the cleats but to effect the rejecting thereof when the bottle caps are not in the proper orientation. Also included is a supplemental sprocket in contact with the interior face of the conveyer belt in the lower extent of the upper section to form an outwardly directed bow in the belt and effect the removal, by gravity, of bottle caps not in the proper orientation. Further included are adjustment means to vary the extent of the bow as a function of the particular bottle cap being conveyed.

It is a further object of the invention to bow the lower end of a vertical conveyor for rejecting improperly oriented caps.

It is a further object of the invention to vary the extent of a conveyor bow as a function of the caps being conveyed.

The foregoing has outlined some of the pertinent objects of the invention. These objects should be construed to merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a new and improved conveying system for lifting and orienting bottle caps, container closures, and crowns comprising a conveyer belt which is formed of articulated sections and with guide rollers to support the belt with an upper lifting section having an essentially vertical path of travel and a lower loading section with an angled path of travel. Also included are sprockets on the guide rollers to effect movement of the belt in an upward path of travel through the lower section and then the upper section. Further included is a plurality of cleats secured to the exterior surface of the conveyer belts. The cleats have supporting surfaces which extend at a generally right angles from the exterior surface of the conveyor belt, each cleat being of a generally rectangular cross section with an upper face and a lower face and with an interior face therebetween wherein the upper cap supporting surface having a trough with a sloped interior recess in contact with a lower hemispherical region for retaining bottle caps, container closures, and crowns thereon in a proper orientation when the upper surface of the bottle cap is in contact with the conveyer belt and the lower edge thereof supported on the supporting surfaces of the cleats but to effect the rejecting thereof when the bottle caps are not in the proper orientation. The lowermost extent of the hemispherical region being closer to the front face than to the rear face, the cleat also has a plurality of bores extending from the front face to the rear face where they can be coupled to the conveyer belt by means of a screw. Also included is a supplemental sprocket in contact with the interior face of the conveyer belt in the lower extent of the upper section to form an outwardly directed bow in the belt and effect the removal, by gravity, of bottle caps not in the proper orientation. Further included are adjustment means to vary the extent of the bow as a function of the particular bottle cap being conveyed. Further included is a plate positioned in close proximity to the cleats in the region of the conveyer belt beneath the bow whereby bottle caps on the conveyer belt may drop under gravity into the hopper due to the orientation of the bow. Still further included is a source of pressurized air adjacent to the upper extent of the upper section at one lateral side of the belt to pneumatically urge bottle caps to the opposite lateral side of the belt with a chute to receive the pneumatically conveyed bottle caps while maintaining their proper orientation. A hopper is also included for a quantity of randomly oriented bottle caps adjacent to the lower section of the conveyer belt for the initial positioning of bottle caps on the conveyer belt prior to movement to the bow. Further included is a shield which has a raised central extent parallel with the direction of flow of the conveyor belt and positioned over the lower loading section whereby bottle caps dropped thereon will limit movement of the caps onto the conveyor except at the leading edge of the plate.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 4 is an enlarged side elevational view of the mechanisms for adjusting the angle of bow in the conveyor.

FIG. 5 is a front elevational view of the mechanism shown in FIG. 4.

FIG. 11 is side elevational view of the cleat of the present invention.

FIG. 12 is cross sectional view taken along line 12—12 of FIG. 11.

Similar reference characters refer to similar parts throughout the several views of the drawings.

DETAILED DESCRIPTION OF THE PREFERRED EMBODIMENT

Figure 1:
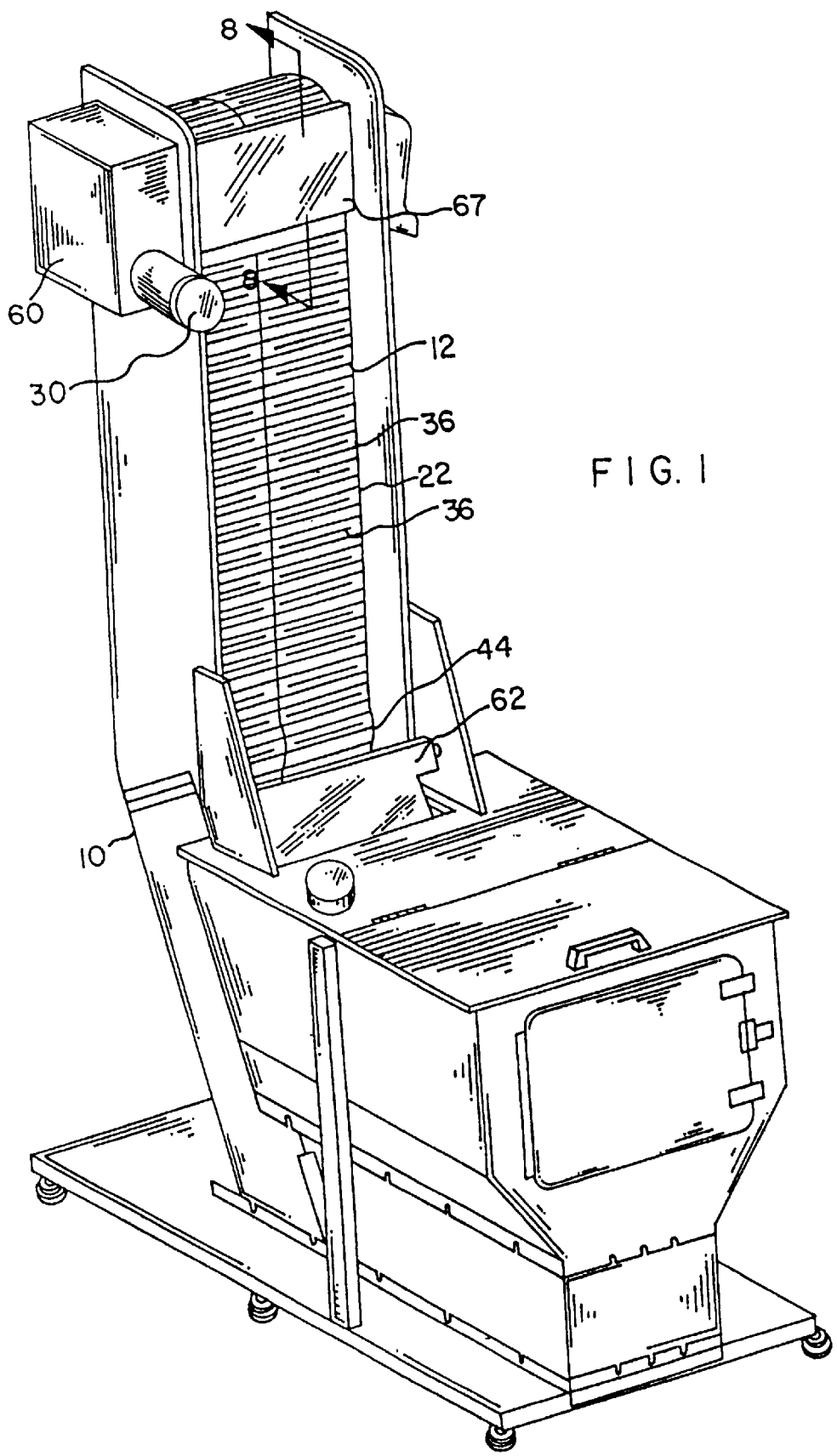
FIG. 1 is a perspective illustration of the preferred embodiment of the new and improved conveying system for lifting and orienting bottle caps constructed in accordance with the principles of the present invention.
Figures 2, 3:
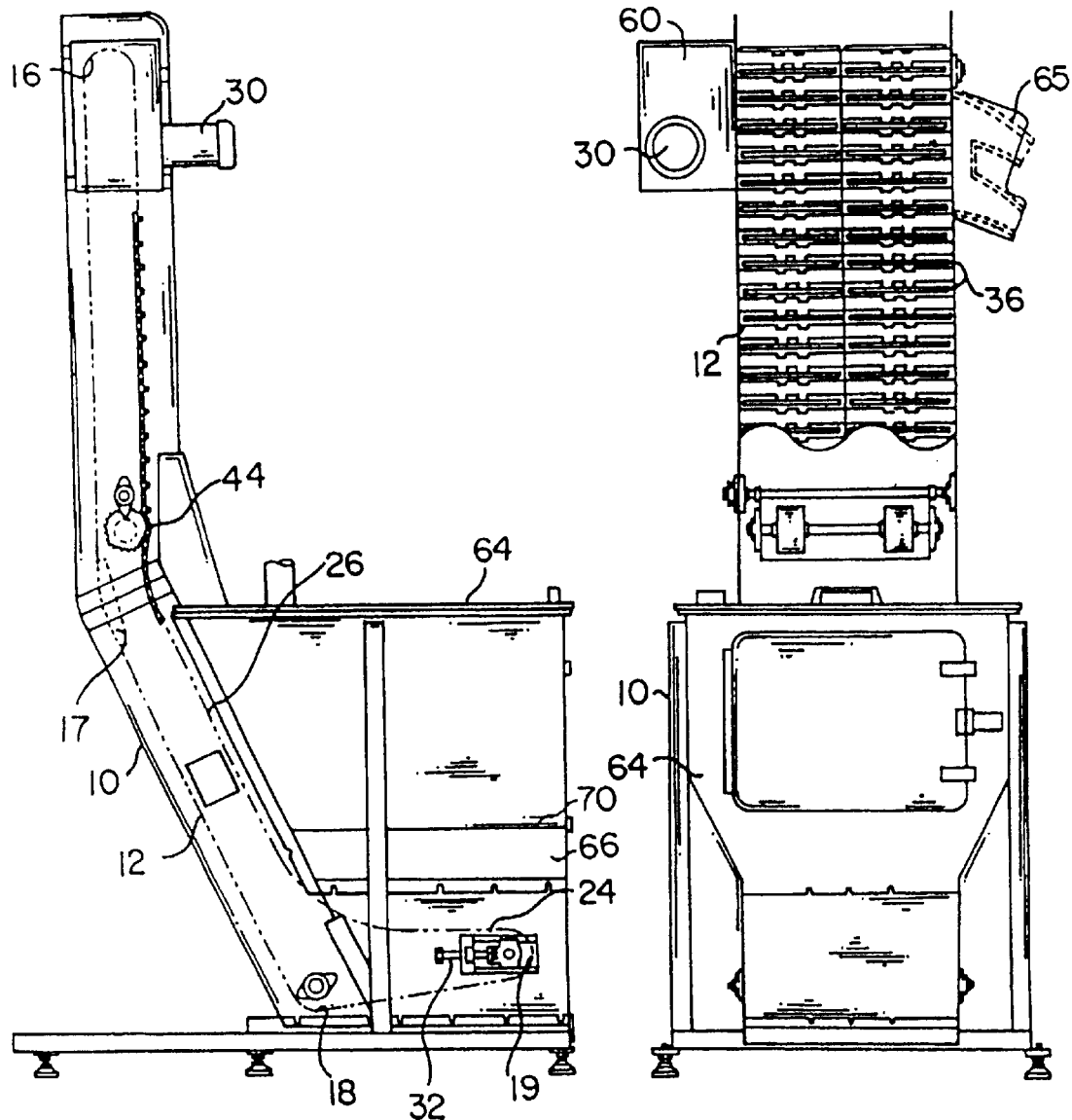
FIG. 2 is a side elevational view of the device shown in FIG. 1.
FIG. 3 is a front elevational view of the device shown in FIGS. 1 and 2 but with parts broken away to shown certain internal constructions.

The present invention, the new and improved conveying system for lifting and orienting bottle caps, is comprised of a plurality of components. In their broadest context, such components include a conveyor belt, sprockets to effect the movement of the belt, a plurality of cleats on the surface of the belt, a supplemental sprocket for creating a bow, adjustment means for varying the extent of the bow, a keeper to maintain the bow at a predetermined configuration, a source of pressurized air at the upper extent of the belt, a guide at the edge of the belt to receive caps, a shield to preclude the direct dropping of caps onto the belt, and a plate to preclude falling caps from inadvertently removing properly oriented caps. Such components are specifically configured and correlated with respect to each other to attain the desired objectives.

More specifically, the main component of the system is a housing 10 adapted to support a conveyor belt 12 constrained for movement in a predetermined path of travel. The conveyor belt is formed of articulated sections 14 coupled with respect to each other along lines perpendicular to the path of travel. Rotatable rollers and ultra high molecular weight guides 16, 17, 18 and 19 support the belt in a configuration to constitute an upper lifting section 22 having an essentially vertical path of travel and a lower loading section 24 with an angled path of travel slightly offset from the horizontal. An intermediate section 26 is located between the upper and lower sections. The upper guide roller 16 is driven by a motor 30 while the remaining guide rollers and ultra high molecular weight guides are idlers for go movement as caused by the belt being driven by the drive roller.

An adjustment device 32 is secured to the housing 10 and is coupled with regard to the roller beneath the lower section to maintain a proper tension on the belt during operation and use.

A pair of sprockets 34 are located on each of the guide rollers to effect movement of the belt in an upward path of travel through the lower section, intermediate section and then the upper section.

Located on the exterior surface of the conveyor belt are a plurality of cleats. Each cleat extends laterally across essentially the entire width of the belt. They are spaced in the direction of the path of travel to receive a bottle cap 38 thereon. Each cleat has a supporting surface extending at right angles from the exterior surface of the conveyor belt. It is this surface which retains bottle caps thereon by gravity in a proper orientation when the upper surface of the bottle cap is in contact with the conveyor belt. In such proper orientation, the cylindrical edge of the cap is in contact with the horizontal surface of the cleat with the closed flat face of the cap in contact with the belt. When so properly oriented, the caps may be elevated through the upper section of the belt in a vertical orientation. When not properly oriented, the bottle caps will simply fall by gravity from the surface of the belt away from the cleat when entering the upper lifting section of the conveyor.

In order to ensure proper orientation of the bottle caps on the conveyor belt for being elevated, supplemental sprockets 34 are provided at the lower most extent of the upper lifting section. Such sprocket is in contact with the interior face of the conveyor belt to form an outwardly bow 44 in the belt. It is this bow which ensures that there is effected the removal, by gravity, of bottle caps not in the proper orientation. An adjustment assembly is provided to vary the extent of the bow as a function of the particular bottle cap being conveyed.

Such adjustment mechanism is in the form of a U-shaped bracket 46 with parallel vertical walls and a lower horizontal wall therebetween. The bracket is supported for rotational motion about the axis of a supporting rod 48 at the upper extent of the vertical walls. The rod 48 extends through the vertical brackets with one end 50 being provided with an adjustment lever 52 for manual rotation of the lever and the rod which functions to vary the angular position of the sprockets with respect to the housing 10 and, hence, the bow.

Figure 6:
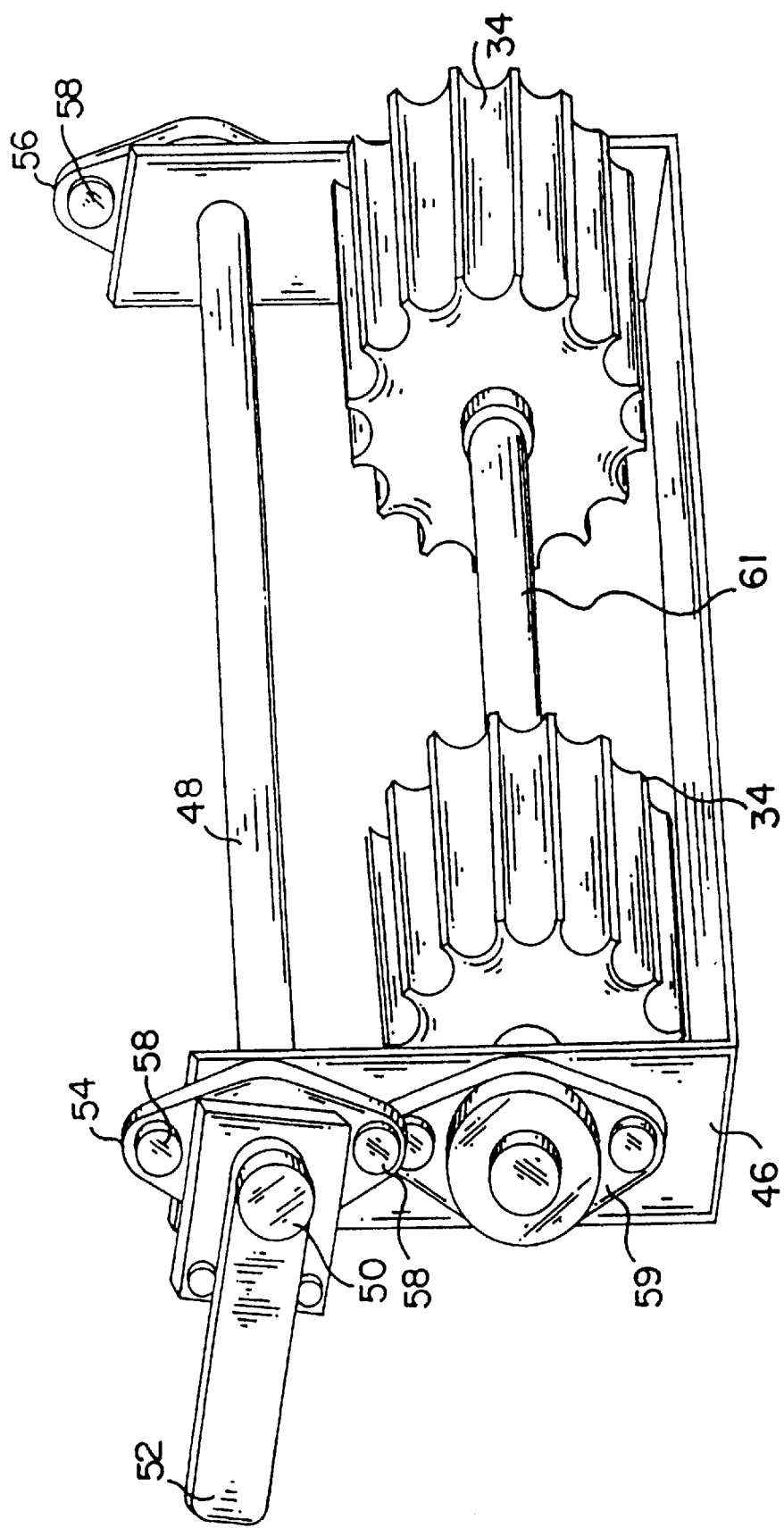
FIG. 6 is a perspective illustration of the mechanism shown in FIGS. 4 and 5.
Figure 8:
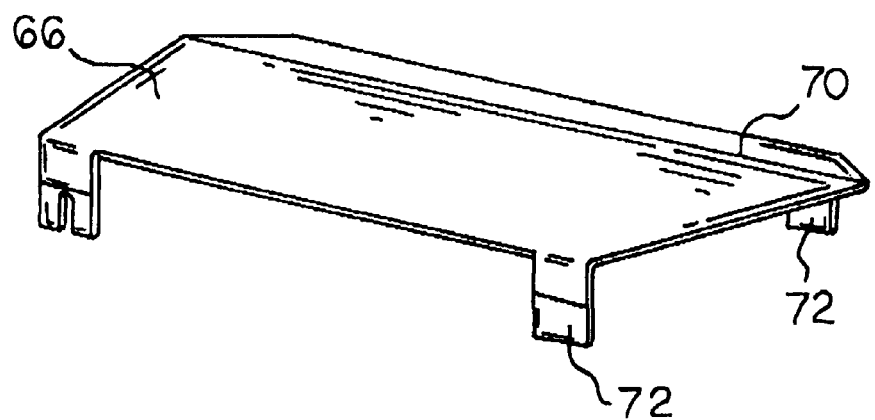
FIG. 8 is a perspective view of the plate positioned over the lower extent of the conveyor.
Figure 7:
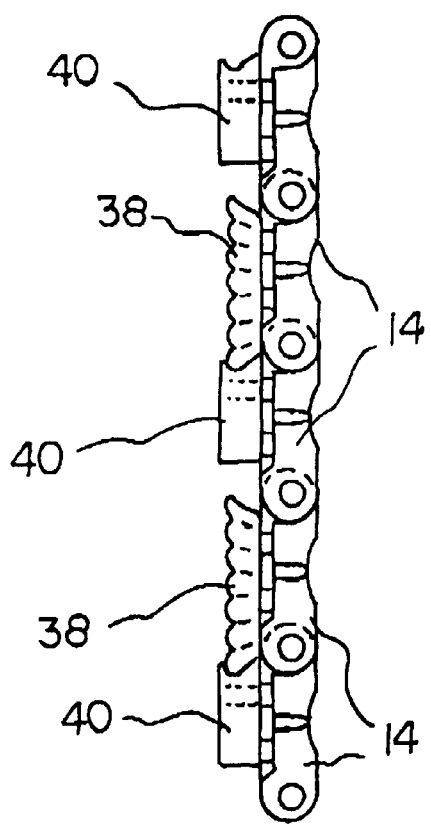
FIG. 7 is a cross sectional view taken along line 8—8 of FIG. 1.
Figure 9:
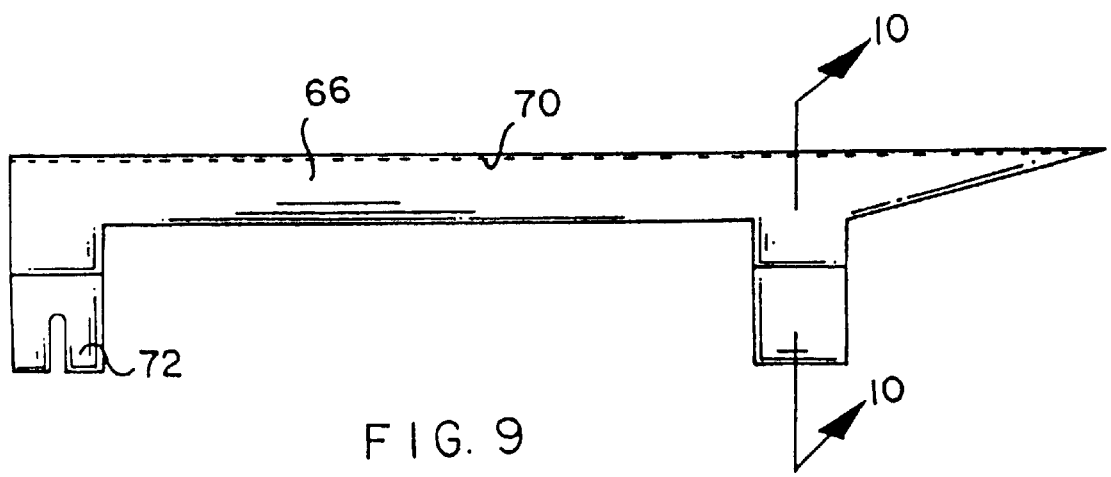
FIG. 9 is a side elevational view of the plate shown in FIG.8.
Figure 10:
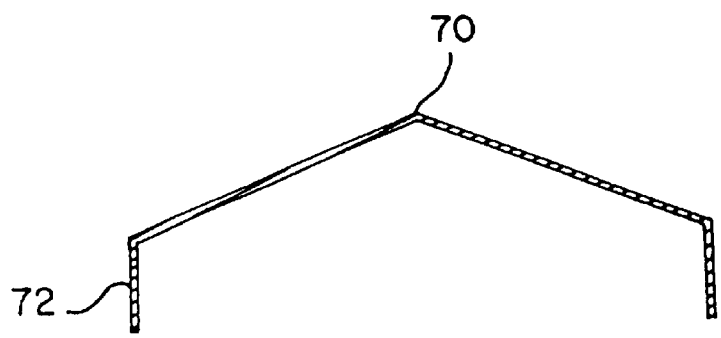
FIG. 10 is a cross sectional view taken along line x—x of FIG. 9.

As can be best seen in FIG. 4, taken in combination with FIGS. 5 and 6, the ends of the rod 48 are secured by releasable collars 54 and 56. The collars are fixed to the housing. Adjustment of a pair of bolts 58 on the collars allows loosening thereof for rotating the rod. The rod having been rotated to the proper orientation by the adjustment lever 52, the bolts are tightened to secure such orientation and sprocket positioning. The collars are secured to the end plates of the housing 10 of the conveyor assembly.

Supplemental collars 59 are on the exterior surfaces of the vertical plates of the U-shaped member. The rod 61 for the supplemental sprockets 34 extends therethrough. It is mounted in bearings for free rotation thereof. A conventional plastic keeper on the vertical side walls of the housing 10 in sliding contact with the exterior face of the belt ensures that the bow will maintain its proper curvature during operation and use.

Located at the upper extent of the upper lifting section is a source 60 of pressurized air. Such source is located at one lateral edge of the conveyor belt and tends to pneumatically eject supported bottle caps to the opposed lateral edge of the conveyor. The opposite lateral edge is provided with a guide chute 65 whereby caps moved laterally by the flow of air will enter the guide chute for further movement. Such caps are then in an elevated orientation for rolling along the chute. They are also oriented for proper receipt at the next station of the system for further processing. In association therewith, a plate 67, preferably a transparent plate, is in close proximity to the bottle caps and flights to ensure the proper movement of the raised and oriented caps from the flights to the chute for further handling.

Located in the path of travel of the conveyor, beyond the hopper, is a plate 62. Such plate is positioned in close proximity to the cleats in the region of the conveyor belt beneath the bow 44. In this manner, bottle caps on the conveyor belt which are dropped by gravity therefrom at the bow will fall back into the hopper under the influence of gravity. The falling caps, however, will not contact and improperly drive caps from the cleats which are already properly positioned. Such improper contact is precluded by the plate 62.

Next located adjacent to the lower loading section of the conveyor is a hopper 64. The hopper is formed as a part of the housing. The housing functions to allow a quantity of caps to be dumped to a location over the lower loading section of the conveyor so that they may be entrained by the cleats and moved in the upper path of travel. This is prior to movement of the caps vertically in the upper lifting section. Note FIGS. 1, 2, 3 and 8.

The last component of the system is a baffle 66. The shield is a plate in a tent like configuration. It has a bend 70 at a slight angle along the longitudinal center thereof in the -direction of flow of the conveyor belt and bottle caps being conveyed. It then has four corner legs 72 depending downwardly therefrom and secured to the housing on the sides of the conveyor adjacent to the lateral edges of the conveyor. In this manner, a space is created above the conveyor at the lower loading section and beneath the lower surface of the baffle. In this manner, bottle caps dumped in the conveyor remain above the shield and are deposited on the conveyor belt only at the leading edge of the loading section immediately in anticipation of the intermediate section.

In summary then, the bow adjusting assembly consists of sprockets 34 mounted on a shaft which is mounted in bearings. These bearings are mounted to a bracket 43 which is in turn mounted to a second rod or shaft 48. This rod is mounted in collars or bearings 54 and 56 which are in turn mounted to the sides of the housing 10. One end of this second shaft extends through the conveyor side. A shaft position clamp mechanism is fixed to the external conveyor side. A lever 52 and dial indicator are attached for ease of use as the shaft is turned, the sprockets rotate in an arc about the center of the shaft. This allows the sprockets 34 to come in contact with the back of the conveyor belt. This in turn displaces the conveyor belt away from its normal path. The conveyor belt is restrained on the opposite side by low friction guide material or keeper. A machined arc in the guide material at the area of the sprocket causes the conveyor belt to follow the arc of the sprocket. This in turn allows an angle change of greater than 20 degrees for a short space on the conveyor. In practice, instead of a final angle of 5 degrees from vertical, it is possible to have an angle past vertical for this short space. This allows the center of the cap to fall from the cleated conveyor while correctly oriented caps remain.

FIGS. 11 and 12 disclose an alternate embodiment of the present inventions wherein the cleat of the present invention would be replaced with an improved cleat 80 shown in FIG. 11. These improved cleats have a supporting surfaces 82 extending outwardly at a generally right angles from the exterior surface of the conveyor belt. Each cleat is of a generally rectangular cross section with an upper face 84 and a lower face 86 and with a front face 87 and a rear face 88 therebetween wherein the upper cap supporting surface has a trough 90. This trough region has a sloped interior recess 92 in contact with a lower hemispherical region 94 for retaining bottle caps thereon in a proper orientation when the upper surface of the bottle cap is in contact with the conveyer belt and the lower edge thereof supported on the supporting surfaces of the cleats but to effect the dropping thereof when the bottle caps are not in the proper orientation. The lowermost extent of the hemispherical region is closer to the front face than to the rear face. The cleat also has a plurality of bores 96 extending from the front face to the rear face where they can be coupled to the conveyer belt by means of a screw 98.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A new and improved conveying system for lifting and orienting bottle caps comprising, in combination:

a conveyer belt formed of articulated sections and with guide rollers to support the belt with an upper lifting section having an essentially vertical path of travel and a lower loading section with an angled path of travel;

sprockets on the guide rollers to effect movement of the belt in an upward path of travel through the lower section and then the upper section;

a plurality of cleats secured to the exterior surface of the conveyer belts, the cleats having supporting surfaces extending outwardly at a generally right angles from the exterior surface of the conveyer belt, each cleat being of a generally rectangular cross section with an upper face and a lower face and with an interior face therebetween wherein the upper cap supporting surface having a lower curved region and a trough with a sloped interior recess in contact with the lower curved region for retaining bottle caps thereon in a proper orientation when the upper surface of the bottle cap is in contact with the conveyer belt and the lower edge thereof supported on the supporting surfaces of the cleats but to effect the dropping thereof when the bottle caps are not in the proper orientation, the lowermost extent of the curved region being closer to the front face than to the rear face, the cleat also having a plurality of bores extending from the front face to the rear face where they can be coupled to the conveyer belt by means of a screw;

a supplemental sprocket in contact with the interior face of the conveyer belt in the lower extent of the upper section to form an outwardly directed bow in the belt and effect the removal, by gravity, of bottle caps not in the proper orientation;

adjustment means to vary the extent of the bow as a function of the particular bottle cap being conveyed;

a plate positioned in close proximity to the cleats in the region of the conveyer belt beneath the bow whereby bottle caps on the conveyer belt may drop under gravity into the hopper due to the orientation of the bow;

a source of pressurized air adjacent to the upper extent of the upper section at one lateral side of the belt to pneumatically urge bottle caps to the opposite lateral side of the belt with a chute to receive the pneumatically conveyed bottle caps while maintaining their proper orientation;

a hopper for a quantity of randomly oriented bottle caps adjacent to the lower section of the conveyer belt for the initial positioning of bottle caps on the conveyer belt prior to movement to the bow; and a baffle having a raised central extent parallel with the direction of flow of the conveyor belt and positioned over the lower loading section whereby bottle caps dropped thereon will limit movement of the caps onto the conveyor except at the leading edge of the plate.

2. A conveying system for lifting and orienting bottle caps comprising:

a conveyer belt formed of articulated sections and with guide rollers to support the belt with an upper section having an essentially vertical path of travel and a lower section with an angled path of travel;

sprockets on the guide rollers to effect movement of the belt in a path of travel through the lower section and then the upper section;

a plurality of cleats secured to the exterior surface of the conveyer belts, the cleats having supporting surfaces extending outwardly at a generally right angles from the exterior surface of the conveyer belt, each cleat being of a generally rectangular cross section with an upper face and a lower face and with an interior face therebetween wherein the upper cap supporting surface having a trough for retaining bottle caps thereon in a proper orientation when the upper surface of the bottle cap is in contact with the conveyer belt and the lower edge thereof supported on the supporting surfaces of the cleats but to effect the dropping thereof when the bottle caps are not in the proper orientation, each cleat having a trough with a sloped interior recess in contact with the lower curved region with the lowermost etent of the curved region being closer to the front face than to the rear face of the cleat; and a supplemental sprocket in contact with the interior face of the conveyer belt in the lower extent of the upper section to form an outwardly directed bow in the belt and effect the removal, by gravity, of bottle caps not in the proper orientation.

* * * * *